sed Dec. 16, 1958

2,864,869
PHENOL PURIFICATION

Henry Peter Crocker, Lower Kingswood, and Reginald Harold Hall, Sutton, England, assignors, by mesne assignments, to Hercules Powder Company, a corporation of Delaware No Drawing. Application February 14, 1956
Serial No. 565,317

Claims priority, application Great Britain
February 24, 1955

9 Claims. (Cl. 260—621)

The present invention relates to the purification of phenols, and in particular to the purification of phenol which is required for subsequent chlorination or sulphonation.

The production of phenol by the oxidation of cumene and the decomposition of the resulting hydroperoxide is well known in the art. The phenol produced in this process can be purified to a degree which satisfies the exacting requirements of the U. S. Pharmacopoeia or British Standard Specification. However, some samples of phenol produced in this way, while conforming to these specifications, still contain impurities which render them unsuitable for certain purposes. It has been found that some samples of highly purified phenol give an undesirable colour when subjected to chlorination, particularly to the mono- and penta-chlorphenols. It has also been found that if such phenols are chlorinated at 60° C. as far as the mono-chlorphenol stage, those which give products having a pronounced red colour are unsuitable for many chlorination processes. Another important application of phenol is in the manufacture of synthetic tannins, for which the suitability of the phenol may be assessed by means of a sulphonation test, for instance one in which two parts of phenol are heated with one part of concentrated sulphuric acid at 150° C. for five minutes; if the resulting mixture is more highly coloured than a light yellow or pale pink the phenol is not always suitable for such application. Contaminants which give rise to colour formation on chlorination and/or sulphonation to render the phenol unsuitable for such uses are hereinafter referred to as colour-producing impurities.

It is an object of the present invention to provide a process for the removal wholly or in part from phenol produced by the decomposition of cumene hydroperoxide, of impurities which give rise to colour formation on chlorination and/or sulphonation.

Accordingly, the present invention for the purification of phenol produced by the decomposition of cumene hydroperoxide comprises the removal of colour-producing impurities by contacting the phenol at an elevated temperature with an amino-compound of the formula R—NH$_2$, wherein R is a hydroxyl, amino- or substituted amino radical.

The invention is particularly directed to the purification of already highly purified phenols such as those conforming to the U. S. P. and B. S. Specifications, but is not confined to the treatment of those phenols.

The amino-compounds of the formula R—HN$_2$, with which the phenol is contacted according to the present invention, include hydroxylamine, hydrazine hydrate, and compounds in which R is a substituted amino group, for instance mono-methylhydrazine, unsymmetrical dimethylhydrazine, mono-ethylhydrazine, unsymmetrical diethylhydrazine, phenylhydrazine, dinitrophenylhydrazine and the like. In general compounds in which R is an alkyl- or aryl-substituted amino group may be used. Some of the amino-compounds are effective in providing a purified phenol which is suitable for both chlorination and sulphonation while others improve the phenol with respect to one of these uses only. It is preferred to use hydrazine hydrate. The amino-compounds are preferably used in the form of the free base. Hydroxylamine must be used in the form of a dilute aqueous solution, since the free base or a concentrated solution of the free base is unstable.

The proportion of amino-compound which should be used will depend on the concentration of the undesired impurities in the phenol, and we have found that for phenols conforming to B. S. Specification No. 523 about 0.02 to 0.2% by weight of hydrazine hydrate based on the weight of phenol is generally suitable. Where the phenol is subsequently recovered by distillation any excess of the amino-compound over that required by the colour-producing impurities may distil over with the phenol, and it is therefore desirable in some cases, for example phenylhydrazine and hydroxylamine, to use an amount of amino-compound just sufficient to bind all the impurity. This can be readily determined by experiment. In the case of hydrazine hydrate any excess of hydrazine can be held back in the distillation by the addition of acid, for instance sulphuric acid, which forms a salt with the hydrazine, and so in this case it is preferred to add an excess of hydrazine. The addition of acid for this purpose when phenylhydrazine or hydroxylamine are being used is not desirable since the acid appears to break up the complex formed between the amino-compound and the impurities and subsequent distillation may result in a contaminated phenol.

The treatment of the impure phenol with the amino-compound is advantageously carried out by mixing the desired proportion of base with the phenol and heating the phenol to a temperature in the range of about 41° to 182° C. i. e. to a temperature at which the phenol is in the liquid state. The exact temperature is not critical but the binding reaction between the amino-compound and the colour-producing impurities takes place more quickly at the higher temperatures. If desired the phenol may be gently refluxed for a few minutes. In the case of a phenol which appeared to contain about 0.1% by weight of colour-producing impurities we have found that, using 0.1% of hydrazine hydrate, a temperature of 80° C. for five to ten minutes gave satisfactory results.

The phenol can be subsequently recovered in a pure state by any convenient method such as extraction, or preferably distillation. As mentioned above, where an excess of hydrazine hydrate has been used it is preferred to add an amount of acid sufficient to combine with all the hydrazine originally added to the phenol and to distil off the phenol, leaving the hydrazine salt and the colour-producing impurities in the kettle of the still.

In a preferred embodiment of the invention the phenol, in addition to being treated with an amino-compound as described above, is contacted in the liquid phase with a surface active earth at an elevated temperature. The treatment with surface active earth may take place either before or after the treatment with the amino-compound. The surface active earths which it is preferred to use are the montmorillonites, also known as fullers' earths, bentonites, Florida earths and attapulgites. They are preferably used in the acid-activated state, although non-acid-activated earths, or earths which have been activated by alkali or heat treatment may also be used. As examples of such surface-active earths available commercially which are acid-activated may be mentioned FE 237, Fulmont 500, Fulmont 711 and Fulmont 800 (fullers' earths) marketed by the Fullers' Earth Union Ltd., Redhill, Surrey, England. Also marketed by the Fullers' Earth Union is Fulbent 182, an alkali-treated earth or bentonite. Surface-active earths which have been activated by heat-treatment include Florex XXXF (a fuller's earth) marketed by the Floridin Company, U. S. A., Attapulgus 50–248–52A and 50–248–52C (attapulgites) marketed by the Attapulgus Clay Company, U. S. A. Other types of surface-active earths which, when acid-treated, may be used are kieselguhr and talc although these are less effective than the montmorillonites.

The amount of surface-active earth used in the purification treatment may be varied between wide limits, for instance between about 0.1 and 10% by weight based on the weight of phenol. The temperatures and times suitable for the treatment of the phenol with the surface-active earth are in general similar to those used in the treatment with the hydrazine compound.

After treatment with the surface-active earth the phenol may be recovered by methods such as filtration, centrifuging, decantation, distillation or fractionation. Where the surface-active earth treatment precedes the treatment with amino-compound, the surface-active earth is conveniently removed by filtration and the phenol may be subjected to a distillation before being treated with amino-compound. Alternatively, the amino-compound treatment may follow directly after the filtration step without an intermediate distillation, the phenol sample being finally distilled subsequent to the amino-compound treatment. Where the amino-compound treatment precedes the treatment with surface-active earth it is desirable to include an intermediate distillation step as well as a final distillation.

The following examples illustrate ways in which the process of the present invention may be carried out in practice.

EXAMPLE 1

Samples of a purified phenol produced by the decomposition of cumene hydroperoxide which satisfied the requirements of the British Standard Specification No. 523, but which were contaminated with impurities which gave rise to undesirable colour formation on chlorination were treated with 0.2% by weight of hydrazine hydrate, 0.4% of phenylhydrazine or 0.46% of hydroxylamine, the latter in dilute aqueous solution, refluxed for five minutes, and subjected to distillation. In the case of hydrazine hydrate a slight excess of sulphuric acid was added prior to the distillation step. The samples were then chlorinated at 60° C. for a time sufficient to give a weight increase corresponding to conversion of the phenol to monochlorphenol and then allowed to cool. A sample of the untreated phenol was also chlorinated as described above. The colour of the chlorinated samples was then estimated in a Lovibond Tintometer (B. D. H. pattern) using a 1 cm. cell. The results are shown in Table I.

*Table I*

| Sample | Treatment | Chlorination Colour |
|---|---|---|
| | | Red |
| 1 | None | >28 |
| 2 | Hydrazine Hydrate | 0.1 |
| 3 | Phenylhydrazine | 0.5 |
| 4 | Hydroxylamine | 2.6 |

EXAMPLE 2

Samples of a purified phenol derived from the decomposition of cumene hydroperoxide which satisfied the requirements of B. S. S. No. 523, but which was contaminated with impurities which gave rise to undesirable colour formation on chlorination, were subjected to treatment with hydrazine hydrate alone as described in Example 1, or were first treated with a surface-active earth at an elevated temperature followed by a treatment with hydrazine hydrate as described in Example 1. The treatment with the surface-active earths, which were fuller's earth grade 8.3% slurry, and fuller's earth grade 237 marketed by the Fullers' Earth Union Ltd., Redhill, Surrey, England, comprised contacting the phenol with 5% by weight of the earth, refluxing for ten minutes, filtering off the earth and distilling the phenol. The fuller's earth treated samples were then refluxed for 5 minutes with hydrazine hydrate, a slight excess of sulphuric acid was added, and the phenol was distilled off. The fuller's earth treated samples, together with an untreated blank were subjected to chlorination as described in Example 1, and the colour estimated in the Lovibond Tintometer. The results are shown in Table II.

*Table II*

| Sample | Treatment | Chlorination Colour |
|---|---|---|
| | | Red |
| 1 | None | >28 |
| 2 | Hydrazine hydrate only (0.2%) | 13 |
| 3 | High activated Fuller's Earth "8.3% Slurry" and 0.2% hydrazine hydrate | 7 |
| 4 | Activated Fuller's Earth Grade 237, and 0.5% hydrazine hydrate | 7 |

EXAMPLE 3

Samples of a purified phenol derived from the decomposition of cumene hydroperoxide which satisfied the requirements of B. S. S. No. 523 but which was contaminated with impurities which gave rise to undesirable colour formation on chlorination and sulphonation were subjected to treatment with hydrazine hydrate alone, to treatment with a surface-active earth alone, and to treatment with both a surface-active earth and with hydrazine hydrate. These samples, together with an untreated phenol sample, were then subjected to chlorination as described in Example 1, and to sulphonation (by mixing a portion with half its volume of 98% sulphuric acid, rapidly heating to 150° C., maintaining at this temperature for five minutes and cooling for one hour) and were then estimated for colour on the Lovibond Tintometer.

The results are shown in Table II. Sample 1 was untreated phenol. Sample 2 was refluxed for 15 minutes with 5% by weight of fuller's earth grade 8.3% slurry, filtered and distilled. Sample 3 was heated at 100° for 15 minutes with 0.25% by weight of hydrazine hydrate; 0.5% of concentrated sulphuric acid was added and the phenol was distilled at atmospheric pressure over two minutes. Sample 4 was treated with fuller's earth as in sample 2, filtered and distilled, refluxed for five minutes with 0.5% hydrazine hydrate, acidified with 1.5% of concentrated sulphuric acid and distilled.

*Table III*

| Sample | Treatment | Chlorination Colour | Sulphonation Colour |
|---|---|---|---|
| | | Red | Red |
| 1 | None | 20 | >28 |
| 2 | Fuller's Earth only | 13 | 8 |
| 3 | Hydrazine hydrate only | 15 | 6 |
| 4 | Fuller's Earth+hydrazine hydrate | 10 | 8 |

It can be seen from Table III that while both treatment with fuller's earth and hydrazine alone effect some purification the greatest purification is brought about when the phenol is subjected to both these treatments.

EXAMPLE 4

Samples of a purified phenol derived from the decomposition of cumene hydroperoxide which satisfied the requirements of B. S. S. No. 523 but which was contaminated with impurities which gave rise to undesirable colour formation on chlorination and sulphonation were subjected to treatment with a surface-active earth alone, and to treatment with both a surface active earth and with hydrazine hydrate. These samples, together with an untreated phenol sample, were then subjected to chlorination as described in Example 1, and to sulphonation as described in Example 3, and were then estimated for colour on the Lovibond Tintometer.

The results are shown in Table IV. Sample 1 was untreated phenol. Sample 2 was refluxed for 10 minutes with 5% by weight of fullers' earth grade 237, filtered and distilled. Sample 3 was refluxed for 10 minutes with 5% by weight of fuller's earth grade 237 filtered and distilled, and then refluxed for 5 minutes with 0.4% of hydrazine hydrate. A slight excess of sulphuric acid was added and the sample was finally distilled.

Table IV

| Sample | Treatment | Chlorination Colour | | Sulphonation Colour | |
|---|---|---|---|---|---|
| | | Red | Yellow | Red | Yellow |
| 1 | Untreated | 13 | 3 | 18.3 | 27.9 |
| 2 | Fuller's Earth only | 1.1 | 0.5 | 6.0 | 2.6 |
| 3 | Fuller's Earth+Hydrazine Hydrate | 1.2 | 0.8 | 2.1 | 0.6 |

EXAMPLE 5

Samples of a purified phenol produced by the decomposition of cumene hydroperoxide which satisfied the requirements of B. S. S. No. 523, but which were contaminated with impurities which gave rise to undesirable colour formation on chlorination and sulphonation were treated with 0.4% by weight of unsymmetrical dimethylhydrazine, or with 0.4% by weight of hydrazine hydrate, refluxed for five minutes and subsequently distilled at atmospheric pressure after the addition of a slight excess of sulphuric acid. These samples, together with an untreated phenol sample, were then subjected to chlorination as described in Example 1 and to sulphonation as described in Example 3, and were estimated for colour on the Lovibond Tintometer.

The results are given in Table V.

Table V

| Sample | Treatment | Chlorination Colour | | Sulphonation Colour | |
|---|---|---|---|---|---|
| | | Red | Yellow | Red | Yellow |
| 1 | Untreated | 15.8 | 3.6 | 18.3 | 22 |
| 2 | Dimethyl Hydrazine | 9.5 | 0.2 | 7.5 | 15.9 |
| 3 | Hydrazine Hydrate | 9.1 | 1.4 | 7.1 | 4.3 |

We claim:

1. The process for the purification of phenol produced by the decomposition of cumene hydroperoxide and containing impurities which give rise to color formation on chlorination which comprises contacting the phenol at an elevated temperature with an amino-compound of the formula R—NH₂, wherein R is selected from the group consisting of hydroxyl, amino, and substituted amino radicals, in a predetermined stoichiometric amount required to bind all of said impurity, heating at a temperature in the range of about 41° C. to about 182° C. until said impurity is bound and distilling phenol free of said amino compound, said impurity and said bound impurity.

2. The process as claimed in claim 1 wherein the amino-compound is hydrazine hydrate.

3. The process as claimed in claim 1 wherein the amino-compound in hydroxylamine.

4. The process as claimed in claim 1 wherein R is a dimethylamino radical.

5. The process as claimed in claim 4 wherein the amino-compound is dimethylhydrazine.

6. The process as claimed in claim 1 wherein R is a phenylamino radical.

7. The process as claimed in claim 6 wherein the amino-compound is phenylhydrazine.

8. The process as claimed in claim 1 wherein the phenol is in addition contacted in the liquid phase with a surface-active earth at an elevated temperature prior to distilling the phenol.

9. The process as claimed in claim 8 wherein the surface-active earth is a montmorillonite.

References Cited in the file of this patent
UNITED STATES PATENTS

| | | |
|---|---|---|
| 1,973,724 | Perkins et al. | Sept. 18, 1934 |
| 2,124,171 | Story | July 19, 1938 |
| 2,247,523 | Schick et al. | July 1, 1941 |
| 2,530,772 | Johnson et al. | Nov. 21, 1950 |
| 2,673,834 | Stevens et al. | Mar. 30, 1954 |
| 2,679,535 | Lavender et al. | May 25, 1954 |
| 2,727,925 | Walker et al. | Dec. 20, 1955 |